(12) United States Patent
Barreto et al.

(10) Patent No.: US 7,732,511 B2
(45) Date of Patent: *Jun. 8, 2010

(54) BITUMINOUS PRODUCTS, THE MIXTURE THEREOF WITH AGGREGATES AND THE USE THEREOF

(75) Inventors: Gilles Barreto, Messimy (FR); Loic Fraboulet, La Garenne Colombes (FR)

(73) Assignee: Ceca S.A., La Garenne Colombes (FR)

( * ) Notice: Subject to any disclaimer, the term of this patent is extended or adjusted under 35 U.S.C. 154(b) by 70 days.

This patent is subject to a terminal disclaimer.

(21) Appl. No.: 11/910,566

(22) PCT Filed: Apr. 4, 2006

(86) PCT No.: PCT/FR2006/000733

§ 371 (c)(1),
(2), (4) Date: Aug. 19, 2008

(87) PCT Pub. No.: WO2006/106222

PCT Pub. Date: Oct. 12, 2006

(65) Prior Publication Data

US 2009/0088499 A1    Apr. 2, 2009

(30) Foreign Application Priority Data

Apr. 5, 2005    (FR) .................................. 05 03343

(51) Int. Cl.
*C08L 95/00* (2006.01)
(52) U.S. Cl. .......................................... 524/68; 524/71
(58) Field of Classification Search .............. 524/68–71
See application file for complete search history.

(56) References Cited

U.S. PATENT DOCUMENTS

| 4,260,019 A * | 4/1981 | Blair, Jr. ..................... 166/400 |
| 4,371,400 A | 2/1983 | Muller et al. |
| 5,743,950 A | 4/1998 | Hendriks et al. |
| 6,588,974 B2 | 7/2003 | Hildebrand et al. |
| 6,846,354 B2 | 1/2005 | Larsen et al. |
| 2004/0033308 A1 | 2/2004 | Barthel et al. |
| 2009/0203815 A1 * | 8/2009 | Barreto et al. ................ 524/68 |

FOREIGN PATENT DOCUMENTS

| EP | 1323867 | 7/2003 |
| EP | 1469038 | 10/2004 |

* cited by examiner

*Primary Examiner*—Peter Szekely
(74) *Attorney, Agent, or Firm*—Steven D. Boyd

(57) ABSTRACT

The invention relates to anhydrous bituminous products containing one or several specific additives which make it possible to substantially reduce a temperature for producing aggregate and bituminous product mixtures in such a way that it ranges from 20 to 40° C., wherein the temperature of the aggregate and the bituminous product mixture during spreading ranges from 10 to 40° C. and the temperature in the core of the aggregate and bituminous product mixtures during compacting can be raised to 50° C. without degrading the standardized properties of the bituminous product and the bituminous product and aggregate mixture and ensuring the process continuity from transport to compacting according to the state of the art. The inventive aggregate and bituminous product mixtures are particularly suitable for tightening, building and servicing road surfaces, pavements and airfield runways.

11 Claims, No Drawings

US 7,732,511 B2

BITUMINOUS PRODUCTS, THE MIXTURE THEREOF WITH AGGREGATES AND THE USE THEREOF

FIELD OF THE INVENTION

The present invention relates to the field of the sealing, construction and repair of road carpets, pavements and aircraft runways in which mixes of aggregates and bituminous products are used.

The expression "bituminous products" is understood to mean natural bitumen or bitumens obtained from a mineral oil. Bitumens obtained by cracking and tars are also considered here, as are resulting mixtures thereof. Blown bitumens—residues of distillation, vacuum distillation or precipitation (for example obtained by propane precipitation)—are examples considered within the context of this invention. Also considered here are bitumens diluted using petroleum solvents or vegetable oils, and polymer bitumens. The expression "aggregates" is understood within the present invention to mean divided materials from quarries, bituminous mix aggregates, milled fragments, clinker or breeze, scoria and slags, and also demolition concrete recycling products.

Many processes for producing mixes of aggregates and bituminous products, hereafter called bituminous mixes, are currently used in this field, which may be classified here in three separate groups: production processes at room temperature; processes at a temperature above 100° C.; and processes at intermediate temperatures, that is to say for which it is necessary to supply thermal energy for the production of the bituminous mix, while allowing the presence of liquid water.

Room-temperature production processes are those for which the mixing of the bituminous binder with the aggregates takes place without supply of thermal energy. The coating of aggregates using a bitumen to which a volatile solvent has been added so as to make it sufficiently fluid at room temperature to allow good coating of the aggregates may be mentioned. The bituminous mix is subsequently used by means of the suitable equipment for transporting, laying and compacting it. This technique is tending to disappear as it consumes solvents in large quantities, which solvents, by evaporating into the atmosphere, create pollution that can be avoided by other techniques. Production techniques using, as bitumen carrier, bitumen emulsions or dispersions in an aqueous solvent may also be mentioned. The bitumen emulsion or dispersion is mixed with the aggregate so as to ensure that it is properly coated. The mix obtained is then used by means of suitable equipment for transporting, laying and possibly compacting it. These techniques have the advantage of concentrating the phase where high temperatures are involved in a plant or at the site where the emulsion is manufactured. The aggregate used at room temperature may contain water. These techniques therefore do not require heat treatment of the aggregate, thereby reducing the consumption of energy during production of the bituminous mix and the production of dust. Moreover, since the mix is at room temperature, that is to say between about 5° C. and 30° C., the emissions of volatile organic compounds are very low. However, the mechanical performance obtained with these mixes is inferior to that obtained with other techniques that will be described below, especially at young age when the mix has not reduced and stabilized its water content. This technique has found its niche in road repair for roadways subjected to light or moderate traffic, which are often associated with flexible supports.

Processes at a temperature above 100° C. use the bitumen in anhydrous form, in a sufficiently fluid state to allow the aggregates to be properly coated. To ensure good coating and good final mechanical properties, it is conventional to dry the aggregates and keep them to a temperature close to that of the bitumen. There are two main types of such processes—continuous processes and batch processes. For the first type, the aggregates are fed continuously into a drum that has a burner for heating the aggregates by flame radiation. In a zone of the cylinder not exposed to the radiation, the aggregates coming from the drying zone are coated with liquid bitumen before exiting and being conveyed to a buffer storage hopper. In the batch process, a mixer maintained at high temperature is used, into which various grades of the aggregate are poured in batches. These are homogenized by mixing and then the bitumen is added by pouring it in. After mixing, the mix of aggregates and bituminous product obtained can be stored in a hopper. The mix obtained is then used by means of suitable equipment allowing it to be transported, spread and optionally compacted. The mix obtained is transported and deposited at a high enough temperature to ensure proper spreading, proper smoothing and proper optional compacting. The choice of process temperature depends on the class of the bitumen. In the case of bitumen-bound concrete and bitumen-bound gravel for example, the temperatures for mixing the aggregates with bituminous products output by a mixing plant, using a pure bitumen of 35/50 penetration index, are generally 150 to 170° C., or even 160 to 180° C. when the weather conditions are harsher and the temperature at which the bituminous mixes are spread is above 130° C. French Standard NF P 98-150 of December 1992 constitutes the reference standard for implementing roadway structures, binder courses and wearing courses made of bituminous mixes, French Standard NF P 98-130 of November 1999 constitutes the reference standard for semi-coarse bituminous concretes and French Standard NF P 98-138 of November 1999 constitutes the reference standard for bitumen-bound gravels. These standards impose a temperature on leaving the mixing plant of 150 to 170° C. and a minimum spreading temperature of 130° C. for a pure 35/50 penetration index bitumen. There is no constraint on the compacting temperature, but this is carried out immediately after the mix has been spread so as to have a start-of compacting temperature as close as possible to the temperature at which the mix was spread. Keeping the bitumen in a sufficiently liquid and therefore sufficiently hot state allows the mix to retain sufficient fluidity for these operations to be carried out correctly.

These two hot-mix processes, which use continuous or batch mixing plants, are the ones most often employed when considering the tonnage of bitumen consumed worldwide, whether for road construction, road repair or sealing. They form the reference processes in the current state of the art. They are in fact the two most robust processes on an industrial scale. As with all the techniques presented here, it is necessary to have precise control over the grade of the aggregates, the quality of the bitumen, which must meet the specified standards per country, and the quality of the process, which is represented inter alia by the quality of the mixing determined by the geometry of the mixing zone, by the mixing energy, by the speeds of the moving parts and by the various durations of the process. Few specific parameters have to be also checked in order to ensure correct execution of the operations and it is found that the behaviour of the bituminous mix remains quite stable in the presence of fluctuations. The simple additional check of the temperature of the aggregates and the bitumen during production and of the temperature of the bituminous mix during spreading makes it possible to ensure that the operations are correctly executed. If we wish to make a comparison, the room-temperature techniques described above require the additional control of parameters such as the pH, the water content, the additive content and the chemical nature of the additives, the position of addition of these additives, the chemical nature of the aggregate and sometimes its age.

However, these two processes for manufacturing bituminous mixes at temperatures above 100° C. described above are not without defects:

the heating and drying of the aggregates result in a substantial consumption of fossil, and therefore non-renewable, fuel. When the process is analysed from the thermal standpoint, it is realized that only the bitumen is initially hot upon entering the mixing plant—the aggregates, which constitute 90 to 96% of the mass of the bituminous mix, are at room temperature. The step of temporarily heating the aggregates is carried out in order to ensure that there is a high-quality bitumen coating and also to ensure proper implementation. However, the product installed acquires beneficial performance only once it has cooled. All the energy expended is finally released into the atmosphere. According to the Colas publication "La route écologique du futur: Analyse du cycle de vie" [*The environmentally-friendly road of the future: Analysis of the life cycle*] by M. Chappat and J. Bilal, the amount of energy is of the order of 300 MJ per ton of bituminous concrete, which represents more than 40% of the energy expenditure up to the point when the product is available to the public;

concomitantly, large quantities of greenhouse gas (GHG) and dust are generated, said dust being partially collected and reinjected into the coating circuit. The implementation itself results in the emission of volatile organic compounds on the spreading site, which have an action on the greenhouse effect. It is possible to attach capture devices on the finisher, but this requires current workshops to be reequipped, and it does not eliminate the emissions emanating from the carpet laid downstream of the finisher. It increases the cost of the final product;

the working conditions are difficult because of the thermal radiation and the gas emissions; and when, for uncontrollable reasons, such as deterioration in the weather conditions, the arrival of nightfall, and a longer transport time for example, the temperature of the premanufactured bituminous mix drops below a certain limit, the mix can no longer be correctly applied, resulting in porosity and mechanical performance drawbacks. The robustness of the process is limited. To offset this effect, it is common practice to produce the bituminous mix at temperatures above those recommended in the official documents. This amounts to exacerbating the first three drawbacks mentioned.

To reduce the extent of the abovementioned drawbacks, it is conceivable to reduce the temperature of manufacture of the bituminous mix. Thus, the fuel consumption needed to heat the components of the mix is reduced, as are the production of greenhouse gases and the discomfiture caused when applying the mix, while trying to modify as little as possible the process for manufacturing the bituminous mix compared with processes at temperatures above 100° C., in particular for the purpose of minimizing the costs.

It is known that the emission of volatile organic compounds is proportional to the temperature of the source, through thermally activated phenomena: the lower the temperature of the source, the lower the emissions. Likewise, the emission of dust decreases with temperature.

PRIOR ART

Solutions have been proposed in the literature for reducing the four abovementioned drawbacks of coating processes at temperatures above 100° C.

Apart from some of these solutions that relate to processes whose production temperatures are above 100° C., there are technical solutions that consist in reducing the manufacturing temperature of the bituminous mix.

According to U.S. Pat. No. 6,588,974, paraffin waxes are added so as to obtain an acceptable bitumen viscosity for coating at a lower temperature, the reduction being around 30° C. The paraffin waxes used act as a plasticizer for the bitumen. For a given temperature, this helps to improve the compacting operation. At the same time, the waxes improve certain mechanical properties of the bituminous mix, such as rutting resistance. However, the addition of paraffin waxes changes the class of bitumen and may result in the standardized threshold of paraffin wax content for bitumens being exceeded. Concomitantly, there is a high risk of degrading the behaviour of the mix when cold, by increasing its brittleness, that is to say by lowering the fracture energy upon frustrated shrinkage and by increasing the fracture temperature. In addition, if the compacting temperature is below the temperature of crystallization of the paraffin waxes in the bitumen, the compacting is much less effective.

U.S. Pat. No. 4,371,400 describes the use of a zeolite for improving the hot flow of a bituminous mix with a very low void content, while improving the indentation resistance at 22° C. and at 40° C.

US 2004/0033.308 describes the use of zeolites, in particular zeolite A, in the production of a hot mix, thereby reducing the temperatures by at least 30° C. while maintaining normal behaviour downstream of the in-plant mixing step. However, this process is not without drawbacks: such a process requires the presence of a storage silo and a zeolite addition system. Furthermore, the use of a zeolite at a dose of at least 0.2% with respect to the aggregate represents a not insignificant additional cost. Moreover, the fluidity of the mix is maintained only when there is foam within the mix, this foam having a limited lifetime. In the event of a long transport time for example, there is a substantial risk of loss of fluidity upon disappearance of the foam.

WO 97/20890 describes a process for manufacturing bituminous mixes, in which the mixing is carried out in two steps. The first step consists in coating the aggregates with a very soft anhydrous bitumen, the mix obtained being between 80 and 115° C. The second step consists in adding hard bitumen powder at a temperature below 50° C. Apart from the necessary modifications to be made to the existing industrial installations, in order to be able to handle and add the bitumen powder, this process has the drawback of requiring time for obtaining good cohesion.

In EP 1 263 885 B1, aggregates at 130° C. are firstly coated with an anhydrous soft binder at 120° C. and then, in the form of foam, hard bitumen and steam are added to the mixer. The mix obtained is then applied between 70 and 100° C. This process also requires time for obtaining good cohesion. In addition, the residual penetration obtained after mixing the two bitumens makes this process unsuitable for temperate or hot countries.

In EP 1 469 038 A1, coarse aggregates are firstly coated with all the bitumen at a temperature above 130° C., and then unheated wet sand is injected into the mixing plant. This has the advantage of limiting the energy consumption. Upon vaporization of the water, the fine aggregate elements are coated and water remains within the mix. The mix leaves the mixing plant at a temperature of between 60 and 100° C. A proposed variant consists in heating the coarse aggregates to 200° C. and then coating them with all of the bitumen and in injecting unheated wet sand. In this case, the water is completely eliminated and the coating of the sand takes place by vaporization of the water. In the first variant, the aim is to control the coating of the sand by vaporization of its water initially in the liquid state, which has the drawback of being a phenomenon greatly dependent on the water content. Furthermore, water remains in the mix which is applied to the ground, this having the drawback of distinguishing it from a reference hot mix. In the second variant, sand is not heated, but it is dried in the mixing plant, by heat transfer from the preheated coarse aggregates. At a given mix temperature on leaving the plant, the amount of heat needed to obtain an anhydrous mix according to this patent application is therefore very similar to that needed to obtain a reference mix.

In EP 1 323 867, the coating of cold aggregates with hot bitumen is facilitated by pretreating the aggregates with an aqueous emulsion of a fluxant and of adhesion dope, and by fluxing the bitumen. The use of a fluxant poses the problem of the rate of increase in cohesion, which is slower than that obtained by cooling in the context of the manufacture according to the reference processes.

Thus, it is found that the solutions proposed for limiting the manufacturing temperature in hot manufacturing processes moreover have a negative impact because the industrial production unit has to be substantially modified and/or because the mix itself loses some of its properties.

SUMMARY OF THE INVENTION

By introducing additives into the bituminous product or into bituminous mixes obtained by mixing them with aggregates using chemical additives at doses of between 0.1 and 20 kg per tonne of bituminous product, it is possible, surprisingly, to lower the bituminous mix production temperature by 20 to 40° C., the bituminous mix spreading temperature by 10 to 40° C. and the core temperature of the bituminous mix during compacting, when this takes place, by possibly up to 50° C., without degrading the standardized properties of the bituminous product or of the bituminous mix, while maintaining management of the process, from transportation to possible compacting, in accordance with the prior art, apart from the abovementioned considerations with regard to the temperatures. These temperature reductions are understood to mean with respect to the prior art reference. French standard NF P 98-150 of December 1992 constitutes the reference for implementing roadway structures, binder courses and wearing courses made of bituminous mixes, French standard NF P 98-130 of November 1999 constitutes the reference for semi-coarse bituminous concretes and French standard NF P 98-138 of November 1999 constitutes the reference for bitumen-bound gravel. To give an example, for a 35/50 penetration index bitumen, these standards indicate that the acceptable limit temperatures are 150 to 170° C. for the coating operation and that the minimum temperature of the mix for spreading is 130° C.

The advantages of the invention over the prior art are listed below and in particular include the alleviation of the four abovementioned drawbacks when carrying out bituminous mix manufacturing processes at temperatures above 100° C.:

fossil fuel consumption is reduced;
dust and GHG emission is reduced;
the difficult working conditions during the spreading and compacting operations are reduced;
the operations of spreading and compacting the bituminous mix are less affected by the weather conditions;
the period of time that the mix can be used after it has been produced is extended;
when two strips of mix are deposited in succession side by side, the join separating them is stronger and better sealed;
thermal shrinkage is more limited, as is the risk of cracking; and
there is less oxidation of the bituminous product, thereby increasing the lifetime of the bituminous mix and making it easier for it to be recycled.

PRESENTATION OF THE INVENTION

The present invention proposes anhydrous bituminous products and mixes obtained from these bituminous products with aggregates, characterized in that said bituminous products contain one or more additives from the following list:

A: the product resulting from the reaction of (di)alk(en)yl phenols on aldeydes, the aldehydes having from 1 to 10 carbon atoms and more particularly 1 to 5 carbon atoms, followed by a (poly)oxyethylation and/or (poly)oxypropylation, the alk(en)yl groups having between 1 and 50 carbon atoms and preferably between 2 and 20 carbon atoms and able to be identical or different in the case of dialk(en)yl phenols, the part formed by (poly)oxyethylation and/or (poly)oxypropylation having a molar mass of not less than 45 g/mol and not more than 20,000 g/mol, the number of phenolic units of product A varying between 3 and 50;

B: a (poly)oxyethylated and/or (poly)oxy-propylated 2,2-bis(4-hydroxyphenyl)propane/epichlorohydrin copolymer, the part formed by (poly) oxyethylation and/or (poly) oxypropylation having a molar mass of not less than 45 g/mol and not more than 20,000 g/mol;

C: a (poly)oxyethylated and/or (poly)oxy-propylated bis (4-hydroxyphenyl)ethane/epichlorohydrin copolymer, the part formed by (poly)oxyethylation and/or (poly) oxypropylation having a molar mass of not less than 45 g/mol and not more than 20,000 g/mol;

D: a (poly)oxyethylated and/or (poly)oxy-propylated bis (4-hydroxyphenyl)methane/epichlorohydrin copolymer, the part formed by (poly)oxyethylation and/or (poly)oxypropylation having a molar mass of not less than 45 g/mol and not more than 20,000 g/mol;

E: the product resulting from the (poly)oxyethylation and/or (poly)oxypropylation of an alkyldicarboxylic acid or mixture of alkyldicarboxylic acids, the alkyl groups having between 1 and 20 and preferably between 1 and 10 carbon atoms, all the parts formed by (poly)oxyethylation and/or (poly)oxy-propylation having a molar mass of not less than 100 g/mol and not more than 20,000 g/mol;

F: the product resulting from the (poly)oxyethylation and/ or (poly)oxypropylation of a fatty acid, the number of carbon atoms of which is between 10 and 30, and more particularly of tall oil fatty acid, the part formed by (poly)oxyethylation and/or (poly)oxypropylation having a molar mass of not less than 100 g/mol and not more than 20,000 g/mol;

G: the product resulting from the reaction between product A and the mixture of products E and F;

H: a salt obtained from an alk(en)yl(aryl)sulphonic acid and an alk(en)yl(aryl)amine, the alk(en)yl(aryl) units having a number of carbon atoms between 6 and 30, and more particularly the salt formed from dodecylbenzenesulphonic acid and tallow amine and the salt formed from dodecylbenzenesulphonic acid and cyclohexylamine; and I: a salt formed from an alk(en)yl(aryl)sulphonic acid and morpholine or pyrazine or pyrazoline or pyrazolone or pyridine or pyridone or pyrimidine or pyrrole or pyrrolidine or pyrrolidone or pyrroline or toluidine or imidazole or indol or indoline or oxindole, the alk(en)yl(aryl) units having a number of carbon atoms of between 6 and 30, and more particularly the salt formed from dodecylbenzenesulphonic acid and morpholine.

The product A may be obtained in a known manner using acid or base catalysis, and can be used directly or after neutralization of the catalyst.

The additive or the additive mixture for the bituminous product according to the invention is soluble in the bituminous product for a concentration with respect to one tonne of bituminous product of between 0.1 and 20 kg.

Within the context of the present invention, the abovementioned additives may be used pure or diluted with petroleum solvents and/or vegetable oil.

The present invention also proposes the use, as supplement, of one or more adhesion dopes according to the prior art, with a dosage with respect to one tonne of bituminous product of between 0.1 and 10 kg and added in one of the ways described in the next paragraph. The term "adhesion dopes" is understood to mean products having an interfacial activity and added to the bituminous product in order to improve the quality of coating of the aggregate with the bituminous product and/or to improve the adhesion of the bituminous product to the aggregate and/or to improve the mechanical performance of the bituminous mix. As non-limiting examples of adhesion dopes, mention may be made of alkylamidopolyamines, alkylimidazolines and alkylimidazopolyamines, products resulting from the reaction between polyamines and fatty carboxylic acids, and also fatty-chain alkylpolyamines, and also products resulting from the reaction between fatty carboxylic acids or vegetable oil and diethanolamine, followed by the reaction with polyamines. As non-limiting examples, the polyamines may be dimethylaminopropylamine, N-aminoethylpiperazine, diethylenetriamine, triethylenetetramine and tetraethylenepentamine.

The present invention also relates to the process for producing the bituminous products, to the mixes obtained by mixing these bituminous products with aggregates, and to the road pavements and carpets produced from these mixes.

The present invention also proposes the addition of the abovementioned additives and adhesion dopes into the bituminous product at any moment during the logistic chain from the refinery to the bituminous mix production site. When several additives A to H according to the invention and optional adhesion dopes are used, it would not be outside the scope of the present invention, when mixing said additives and dopes with the bituminous product, for this to be carried out by adding them in succession or for them to be firstly mixed together before being brought into contact with the bituminous product. During the addition step, the temperature of the bituminous product is generally between 100 and 250° C., depending on the penetration class of the bituminous product and depending on its ring-and-ball softening temperature, and the temperature of the additives and optional adhesion dopes is in general between room temperature and 200° C., taking into account, for obvious safety reasons, the flashpoint of the additives and adhesion dopes. If the additive or additives are kept hot, it may be advantageous for it (them) to be kept stirred in order to avoid hot spots and cold spots. The additive(s) and the optional adhesion dope(s) may be added in the solid state, either by a manual mechanical operation or by using a metering system suitable for solid products. The additive(s) and the optional adhesion dope(s) may also be added in the liquid state, either by being poured into a tank containing the bituminous product, in which case the contents must be recirculated in general for a time of at least 15 min. before use, or by injection on a line transporting the bituminous product. The line transporting the bituminous product may be equipped downstream of the point of injection with a static mixer for improving the dispersion of the additive(s). In the case in which the additives according to the invention and the optional adhesion dopes are added to a tank containing the bituminous product, the bituminous product with additives can be stored in the same way as the bituminous product with no additives, without introducing any additional drawback in this step of the process. The additive(s) and the optional adhesion dope(s) may also be sprayed onto the heated aggregates, either before the bituminous product is added or while this is being added.

According to the invention, the aggregates and bituminous product may be mixed at an aggregate temperature of between 60 and 200° C., but preferably between 100 and 200° C. During the mixing, the temperature of the bituminous product is between 100 and 250° C. These temperatures depend, on the one hand, on the penetration class of the bituminous product—the lower the penetration, the hotter the bituminous product and the aggregate must be—and, on the other hand, on the ring-and-ball softening temperature of the bituminous product—the higher the softening temperature, the hotter the bituminous product and the aggregate must be.

EXAMPLES

In the following examples, the additives were added to the bitumen at 160° C., on a hotplate with stirring at 60 rpm for 15 minutes.

The penetration and ring-and-ball softening point measurements on the bituminous mixes were in accordance with the NF EN 1426 and NF EN 1427 standards, respectively.

Example 1

The following additives were added to a 35/50 penetration index bitumen from Total called AZALT, obtained from the Donges refinery:

Additive 1 (type F): the result of the condensation of an ethylene oxide/propylene oxide copolymer, with an approximately 4600 g/mol molar mass $M_w$ and an ethylene oxide/propylene oxide molar ratio of between 30/70 and 45/55, and tall oil fatty acid, the copolymer/fatty acid mass ratio being 80/20, in an aromatic cut solvent having 9 to 11 carbon atoms, the content of which being 60%;

Additive 2 (type G), obtained by mixing, in proportions of 25/75, the results of two reactions, namely the condensation reaction between an ethylene oxide/propylene oxide copolymer, with an approximately 3800 g/mol molar mass $M_w$ and an ethylene oxide/propylene oxide molar ratio of between 20/80 and 10/90, and succinic acid, the copolymer/acid mass ratio being 85/15, and the condensation reaction between an ethylene oxide/propylene oxide copolymer, with an approximately 4600 g/mol molar mass $M_w$ and an ethylene oxide/propylene oxide molar ratio between 30/70 and 45/55, and tall oil fatty acid, the copolymer/fatty acid mass ratio being 80/20. This mixture was then diluted to 45% in an aromatic cut solvent having 9 to 11 carbon atoms. Additive 2 was therefore the result of the reaction of the abovementioned mixture with product A, the mixture/product A mass ratio being 40/60.

Product A was the result of the reaction between nonylphenol and paraformaldehyde in acid catalysis with a nonylphenol/paraformaldehyde mass ratio of 90/10, followed by ethoxylation with 8 to 9 moles of ethylene oxide per phenyl ring. The reactions were carried out in an aromatic cut solvent having 9 to 11 carbon atoms, the content of which in the additive 2 being 60%; and Additive 3, an adhesion dope sold by CECA under the name CECABASE 260, a product resulting from the reaction between a vegetable oil and diethanolamine, diethylenetriamine and triethylene-tetramine.

The results of the penetration and ring-and-ball softening point measurements are combined in the following table:

| No. | Nature of the specimen | Penetration (×0.1 mm) at 25° C. | Penetration limits (×0.1 mm) | Softening point (° C.) | Softening point limits (° C.) |
|---|---|---|---|---|---|
| 1 | Pure bitumen | 37 | 35-50 | 53.5 | 50-58 |
| 2 | Bitumen + Additive 1 at 5 kg/t | 37 | | 54 | |
| 3 | Bitumen + Additive 1 at 5 kg/t + Additive 3 at 2 kg/t | 36 | | 53 | |
| 4 | Bitumen + Additive 2 at 5 kg/t | 39 | | 54 | |

In trial 3, Additive 3 was added a few minutes after Additive 1 was added.

The table shows that the bitumen remains in the same bitumen class. The dynamic viscosity was measured at 110° C. at a shear rate of 50 s$^{-1}$ without observing any significant deviation—the viscosity was 3.7 Pa·s.

Example 2

The following additives were added to a 35/50 penetration index AZALT bitumen from Total coming from the La Mède refinery:

Additive 4 (type A): resulting from the ethoxylation, with 4 moles of ethylene oxide per phenyl ring, of the product obtained by the reaction between a nonylphenol/tert-butylphenol mixture in proportions of between 70/30 and 55/45 and paraformaldehyde in base catalysis and in an aromatic cut solvent having 9 to 11 carbon atoms, the phenol mixture/paraformaldehyde mass ratio being 85/15;

Additive 5 (type A): resulting from the reaction of nonylphenol and paraformaldehyde in acid catalysis, the nonylphenol/paraformaldehyde mass ratio being 85/15, followed by ethoxylation with 4 to 5 moles of ethylene oxide per phenol ring in an aromatic cut solvent having 9 to 11 carbon atoms, the solvent content being 50%;

Additive 6 (type B): EPIKOTE 828 resin propoxylated with propylene glycol of approximately 4000 g/mol molar mass $M_w$, the resin/polymer mass ratio being 15/85; and Additive 7 (type E): the result of the condensation reaction between an ethylene oxide/propylene oxide copolymer, with an approximately 3800 g/mol molar ratio $M_w$ and an ethylene oxide/propylene oxide molar ratio of between 10/90 and 20/80, and succinic acid, the copolymer/acid mass ratio being 95/5, in an aromatic cut solvent having 9 to 11 carbon atoms, the solvent content being 50%.

The results of the penetration and ring-and-ball softening point measurements are combined in the following table:

| Nature of the specimen | Penetration (×0.1 mm) at 25° C. | Penetration limits (×0.1 mm) | Softening point (° C.) | Softening point limits (° C.) |
|---|---|---|---|---|
| Pure bitumen | 43 | 35-50 | 51.5 | 50-58 |
| Bitumen + Additive 4 at 5 kg/t | 43 | | 51.5 | |
| Bitumen + Additive 5 at 5 kg/t | 45 | | 51.5 | |
| Bitumen + Additive 6 at 5 kg/t | 46 | | 51 | |
| Bitumen + Additive 7 at 5 kg/t | 48 | | 51.5 | |

This table shows that the bitumen remains in the same bitumen class. The dynamic viscosity was measured at 110° C. at a shear rate of 50 s$^{-1}$ without any significant difference being noted—the viscosity was 2.4 Pa·s.

Example 3

We manufactured, on a fixed plant possessing a drier/mixer drum, a 0/10 BBSG (a semi-coarse bituminous concrete mix) of Class 3 in three different grades, all three possessing the following granular formula:

| calcareous filler | limestone | 5% |
|---|---|---|
| 0/2 sand | rhyolite | 34% |
| 2/6 aggregate | rhyolite | 12% |
| 6/10 aggregate | rhyolite | 49%. |

The bitumen used was a 35/50 AZALT from Total with the following characteristics: 35/50 penetration index; 1.031 density; 50° C. ring-and-ball softening point. The content of bituminous product was 6.3 g per 100 g of aggregates. For the first two grades, the bitumen was used pure. For the third grade, the following two additives were added to the bitumen, with respective doses of 3.7 and 1.3 kg per tonne of bitumen:

Additive 8 (type E), the result of the condensation reaction between an ethylene oxide/propylene oxide copolymer, with an approximately 3800 g/mol molar mass $M_w$ and an ethylene oxide/propylene oxide molar ratio of between 10/90 and 20/80, and succinic acid, the copolymer/acid mass ratio being 95/5, in an aromatic cut solvent having 9 to 11 carbon atoms, the solvent content being 50%; and Additive 9 (type B), the condensate resulting from the condensation of polypropylene glycol of approximately 4000 g/mol molar mass $M_w$ and EPIKOTE 828 resin, the polymer/resin mass ratio being 85/15, followed by ethoxylation with a condensate/ethylene oxide mass ratio of 90/10.

The additives were introduced via the hatch of the bitumen storage tank. The thus additive-laden bitumen was used after 30 minutes of recirculation in the storage tank.

During production of the bituminous mix, the following temperatures were respected:

the aggregate was heated to 160° C. in the case of the first grade and 120° C. in the case of the following two grades;

the bitumen in all cases was used at 160° C.

The spreading was carried out using a Marini MF905 finisher, the speed of advance of which being 5 m/min, and an Ammann AV95 compactor, the speed of advance of which being 4 km/h. The number of passes made was 11, with a vibration amplitude of 0.62 mm and a frequency of 50 Hz. During compacting, the following temperatures of the BBSG were respected:

on pure bitumen, 135° C. for the first grade and 80° C. for the second grade;

on bitumen with additives, 80° C.

The following were measured on site: the apparent density using a gamma density probe according to the NF P 98-241-1 standard; the apparent density by hydrostatic weighing according to the NF P 98-250-6 standard; and the mean texture depth according to the NF EN 13036-1 standard. The porosities were calculated from the gamma densities corrected by the hydrostatic weighing measurements. The BBSG temperatures were those measured in the core.

| Nature of the bitumen | $T_{agt}$ at production (° C.) | $T_{BBSG}$ at laying (° C.) | $T_{BBSG}$ at compacting (° C.) | Average texture depth (mm) | Average porosity (%) | Number of porosity measurements above the 8% threshold/ total number of porosity measurements |
|---|---|---|---|---|---|---|
| Pure bitumen | 160 | 160 | 135 | 0.7 | 5.3 | 0/20 |
| Pure bitumen | 120 | 120 | 80 | 0.8 | 7.2 | 5/16 |
| Bitumen + additives | 120 | 120 | 80 | 0.8 | 6 | 0/15 |

The average texture depths were all acceptable. From the average porosity standpoint, it may be seen that the best BBSG produced is that constituting the reference. Compared with the porosity limits for the 0/10 Class 3 BBSGs, which are 4% and 8%, this BBSG lies in the lower part. The BBSG produced under degraded thermal production conditions without additive has an average porosity approaching the upper limit. The average porosity difference from the reference BBSG is reduced when, despite the degraded thermal production conditions, the additive is added to the bitumen. The last column in the table indicates the ratio of the number of porosity measurement points outside the standard to the total number of porosity measurements. It shows that there are 5 off-standard points in the case of the trial with no additive under degraded thermal conditions, i.e. more than 30% of the measurements, including one point for which the porosity was equal to 10.2%. There are no off-standard points when the additive is present.

The invention claimed is:

1. Anhydrous bituminous products, characterized in that they contain one or more additives selected from:

(A) the product resulting from the reaction of (di)alk(en)yl phenols on aldeydes, the aldehydes having from 1 to 10 carbon atoms, followed by a (poly)oxyethylation and/or (poly)oxypropylation, the alk(en)yl groups having between 1 and 50 carbon atoms, and able to be identical or different in the case of dialk(en)yl phenols, the part formed by (poly)oxyethylation and/or (poly)oxypropylation having a molar mass of not less than 45 g/mol and not more than 20,000 g/mol, the number of phenolic units of product A varying between 3 and 50;

(B) a (poly)oxyethylated and/or (poly)oxypropylated 2,2-bis(4-hydroxyphenyl)propane/epichlorohydrin copolymer, the part formed by (poly)oxyethylation and/or (poly)oxypropylation having a molar mass of not less than 45 g/mol and not more than 20,000 g/mol;

(C) a (poly)oxyethylated and/or (poly)oxypropylated bis (4-hydroxypheny)ethane/epichlorohydrin copolymer, the part formed by (poly)oxyethylation and/or (poly) oxypropylation having a molar mass of not less than 45 g/mol and not more than 20,000 g/mol;

(D) a (poly)oxyethylated and/or (poly)oxypropylated bis (4-hydroxyphenyl)methane/epichlorohydrin copolymer, the part formed by (poly)oxyethylation and/or (poly)oxypropylation having a molar mass of not less than 45 g/mol and not more than 20,000 g/mol;

(E) the product resulting from the (poly)oxyethylation and/ or (poly)oxypropylation of an alkyldicarboxylic acid or mixture of alkyldicarboxylic acids, the alkyl groups having between 1 and 20, all the parts formed by (poly) oxyethylation and/or (poly)oxypropylation having a molar mass of not less than 100 g/mol and not more than 20,000 g/mol;

(F) the product resulting from the (poly)oxyethylation and/ or (poly)oxypropylation of a fatty acid, the number of carbon atoms of which is between 10 and 30, the part formed by (poly)oxyethylation and/or (poly)oxypropylation having a molar mass of not less than 100 g/mol and not more than 20,000 g/mol;

(G) the product resulting from the reaction between product A and the mixture of products E and F;

(H) a salt obtained from an alk(en)yl(aryl)sulphonic acid and an alk(en)yl(aryl)amine, the alk(en)yl(aryl) units having a number of carbon atoms between 6 and 30; or (I) a salt formed from an alk(en)yl(aryl)sulphonic acid and morpholine or pyrazine or pyrazoline or pyrazolone or pyridine or pyridone or pyrimidine or pyrrole or pyrrolidine or pyrrolidone or pyrroline or toluidine or imidazole or indol or indoline or oxindole, the alk(en)yl(aryl) units having a number of carbon atoms of between 6 and 30.

2. Bituminous products according to claim 1, characterized in that the additive or the additive mixture is introduced with a dosage with respect to one tonne of bituminous product of between 0.1 and 20 kg.

3. Bituminous products according to claim 1, characterized in that they contain one or more adhesion dopes with a dosage with respect to one tonne of bituminous product of between 0.1 and 10 kg.

4. Bituminous mixes obtained by mixing the bituminous products as defined in claim 1 with aggregates.

5. Bituminous products according to claim 1, characterized in that the additive or the additive mixture is introduced with a dosage with respect to one tonne of bituminous product of between 1 and 10 kg.

6. Bituminous products according to claim 1, characterized in that they contain one or more adhesion dopes with a dosage with respect to one tonne of bituminous product of between 1 and 10 kg.

7. Process for producing bituminous mixes, characterized in mixing a bituminous product comprising anhydrous bituminous products and one or more additives selected from:
- (A) the product resulting from the reaction of (di)alk(en)yl phenols on aldeydes, the aldehydes having from 1 to 10 carbon atoms and more particularly 1 to 5 carbon atoms, followed by a (poly)oxyethylation and/or (poly)oxypropylation, the alk(en)yl groups having between 1 and 50 carbon atoms and able to be identical or different in the case of dialk(en)yl phenols, the part formed by (poly)oxyethylation and/or (poly)oxypropylation having a molar mass of not less than 45 g/mol and not more than 20,000 g/mol, the number of phenolic units of product A varying between 3 and 50;
- (B) a (poly)oxyethylated and/or (poly)oxypropylated 2,2-bis(4-hydroxyphenyl)propane/epichlorohydrin copolymer, the part formed by (poly)oxyethylation and/or (poly)oxypropylation having a molar mass of not less than 45 g/mol and not more than 20,000 g/mol;
- (C) a (poly)oxyethylated and/or (poly)oxypropylated bis(4-hydroxypheny)ethane/epichlorohydrin copolymer, the part formed by (poly)oxyethylation and/or (poly)oxypropylation having a molar mass of not less than 45 g/mol and not more than 20,000 g/mol;
- (D) a (poly)oxyethylated and/or (poly)oxypropylated bis(4-hydroxyphenyl)methane/epichlorohydrin copolymer, the part formed by (poly)oxyethylation and/or (poly)oxypropylation having a molar mass of not less than 45 g/mol and not more than 20,000 g/mol;
- (E) the product resulting from the (poly)oxyethylation and/or (poly)oxypropylation of an alkyldicarboxylic acid or mixture of alkyldicarboxylic acids, the alkyl groups having between 1 and 20, all the parts formed by (poly)oxyethylation and/or (poly)oxypropylation having a molar mass of not less than 100 g/mol and not more than 20,000 g/mol;
- (F) the product resulting from the (poly)oxyethylation and/or (poly)oxypropylation of a fatty acid, the number of carbon atoms of which is between 10 and 30, the part formed by (poly)oxyethylation and/or (poly)oxypropylation having a molar mass of not less than 100 g/mol and not more than 20,000 g/mol;
- (G) the product resulting from the reaction between product A and the mixture of products E and F;
- (H) a salt obtained from an alk(en)yl(aryl)sulphonic acid and an alk(en)yl(aryl)amine, the alk(en)yl(aryl) units having a number of carbon atoms between 6 and 30; or
- (I) a salt formed from an alk(en)yl(aryl)sulphonic acid and morpholine or pyrazine or pyrazoline or pyrazolone or pyridine or pyridone or pyrimidine or pyrrole or pyrrolidine or pyrrolidone or pyrroline or toluidine or imidazole or indol or indoline or oxindole, the alk(en)yl(aryl) units having a number of carbon atoms of between 6 and 30; and aggregates at a temperature of the aggregates within the temperature range from 60 to 200° C.

8. Process for producing a bituminous product according to claims 7, characterized in that it includes bringing one or more additives into contact with the bituminous product at a temperature within the temperature range from 100 to 250° C.

9. Process for producing bituminous mixes according to claim 7, characterized in that the mixing of the bituminous product with aggregates is carried out at an aggregate temperature lying within the temperature range from 100 to 200° C.

10. Process for producing bituminous mixes according to claim 7, characterized in that the mixing of the bituminous product with aggregates is carried out at a bituminous product temperature lying within the temperature range from 100 to 250° C.

11. Process for producing bituminous mixes according to claim 7, characterized in that the additive is added to a mixer before or during the addition of the bituminous product.

* * * * *